United States Patent
Xiang et al.

(10) Patent No.: US 12,288,461 B2
(45) Date of Patent: Apr. 29, 2025

(54) VIBRATION CONTROL METHOD, VIBRATION CONTROL DEVICE, AND NON-TRANSITORY COMPUTER-READABLE STORAGE MEDIUM

(71) Applicants: AAC ACOUSTIC TECHNOLOGIES (SHENZHEN) CO., LTD., Shenzhen (CN); AAC Microtech (Changzhou) Co., Ltd., Changzhou (CN)

(72) Inventors: Zheng Xiang, Shenzhen (CN); Xiuyue Wang, Shenzhen (CN)

(73) Assignees: AAC ACOUSTIC TECHNOLOGIES (SHENZHEN) CO., LTD., Shenzhen (CN); AAC Microtech (Changzhou) Co., Ltd., Changzhou (CN)

( * ) Notice: Subject to any disclaimer, the term of this patent is extended or adjusted under 35 U.S.C. 154(b) by 0 days.

(21) Appl. No.: 17/920,399

(22) PCT Filed: Apr. 26, 2022

(86) PCT No.: PCT/CN2022/089222
§ 371 (c)(1),
(2) Date: Oct. 19, 2023

(87) PCT Pub. No.: WO2023/197375
PCT Pub. Date: Oct. 19, 2023

(65) Prior Publication Data
US 2024/0212464 A1  Jun. 27, 2024

(30) Foreign Application Priority Data
Apr. 13, 2022 (CN) ......................... 202210384213.3

(51) Int. Cl.
H04B 3/36 (2006.01)
G08B 6/00 (2006.01)
(52) U.S. Cl.
CPC ...................................... G08B 6/00 (2013.01)
(58) Field of Classification Search
CPC .............. G08B 6/00; G06F 3/01; G06F 3/016
See application file for complete search history.

(56) References Cited

U.S. PATENT DOCUMENTS 9,213,408 B2 * 12/2015 Gandhi ................... G06F 3/016
9,729,730 B2 *  8/2017 Levesque .............. H04M 19/04
(Continued)

*Primary Examiner* — Toan N Pham
(74) *Attorney, Agent, or Firm* — Wiersch Law Group

(57) ABSTRACT

A vibration control method, a vibration control device, and a non-transitory computer-readable storage medium are provided. Target effect parameters are obtained in a preset vibration effect design model with reference to a haptic effect demand index, effect parameters in the vibration effect design model including a granularity parameter, a sharpness parameter and a hardness parameter. A vibration control signal is generated based on the target effect parameter. The actuator is controlled to vibrate based on the vibration control signal. With the implementations of the present disclosure, the vibration control models of the actuator can be adaptively designed based on different haptic effect demand scenarios, thereby ensuring the diversity of haptic effects and the adaptability to the scenarios. A variety of perception factors are considered in the vibration effect of the actuator, thereby providing the user with a more complex haptic feedback experience.

20 Claims, 6 Drawing Sheets

(56) References Cited

U.S. PATENT DOCUMENTS 9,846,485 B2 * 12/2017 Birnbaum ............ A61B 5/0002
9,939,900 B2 *  4/2018 Cruz-Hernandez .......................... G06F 1/1652

* cited by examiner

VIBRATION CONTROL METHOD, VIBRATION CONTROL DEVICE, AND NON-TRANSITORY COMPUTER-READABLE STORAGE MEDIUM

TECHNICAL FIELD

The present disclosure relates to the technical field of electronic devices, and particularly, to a vibration control method, a vibration control device, and a non-transitory computer-readable storage medium.

BACKGROUND

With the rapid development of science and technology, various terminal devices have been widely used in users' daily life and work. In order to improve the user experience, researchers in various fields constantly pursue improving product performance. Under this background, haptic feedback, as a typical application on the terminal device, is a factor that cannot be ignored in improving the user experience of the terminal device.

Tactile sense is a sensory system related to the most sensory cells in the human body, and it distributes at every inch of the skin of the user's body. With these tactile sensory cells, the user can clearly feel hot and cold, pain, swelling, stroking, or pressure. Therefore, haptic feedback has strong interactivity and can bring various perceptual experiences to the user.

In the related art, applications such as video, games, and music in terminal devices are no longer limited to outputting auditory and visual feedback to the user, and haptic feedback is getting more and more widely used. In the related art, a vibration response manner of an actuator performing haptic feedback is usually relatively simple, and can only provide a simple haptic effect to the user. For a variety of different haptic feedback demand scenarios, there are few types of haptic effects that can be provided, resulting in limited haptic effect experience for the end user.

SUMMARY

The present disclosure provides a vibration control method, a vibration control device, and a non-transitory computer-readable storage medium, which can at least solve the problems of relatively simple haptic effects and less types of haptic effects provided by the terminal device in the related art that.

In order to solve the above technical problems, some embodiments of the present disclosure provide a vibration control method, and the method includes: obtaining, with reference to a haptic effect demand index, target effect parameters from a vibration effect design model that is preset, effect parameters of the vibration effect design model including a granularity parameter, a sharpness parameter, and a hardness parameter; generating a vibration control signal based on the target effect parameters; and controlling an actuator to vibrate based on the vibration control signal.

As an improvement, the vibration control method further includes, prior to the obtaining, with reference to the haptic effect demand index, the target effect parameters from the vibration effect design model: obtaining a vibration application scenario currently triggered by a terminal; and determining the haptic effect demand index based on the vibration application scenario.

As an improvement, the determining the haptic effect demand index based on the vibration application scenario includes: querying, based on the vibration application scenario, a demand index library that is preset, the demand index library comprising a preset mapping relationship between a vibration application scenario and a haptic effect demand index; in response to no querying result, querying an associated vibration application scenario in the demand index library based on a scenario characteristic of the vibration application scenario; and determining, based on a haptic effect demand index corresponding to the associated vibration application scenario in the demand indicator library, the haptic effect demand index corresponding to the vibration application scenario currently triggered by the terminal.

As an improvement, the determining, based on the haptic effect demand index corresponding to the associated vibration application scenario in the demand indicator library, the haptic effect demand index corresponding to the vibration application scenario currently triggered by the terminal includes: obtaining an association evaluation index between the vibration application scenario currently triggered by the terminal and the associated vibration application scenario; and adjusting, with reference to the association evaluation index, the haptic effect demand index corresponding to the associated vibration application scenario in the demand index library, to obtain the haptic effect demand index corresponding to the vibration application scenario currently triggered by the terminal.

As an improvement, the determining the haptic effect demand index based on the vibration application scenario includes: obtaining a general haptic effect demand index corresponding to an upper-level vibration application scenario to which the vibration application scenario belongs, the upper-level vibration application scenario comprising various types of vibration application scenarios with different haptic effect demand levels; and adjusting the general haptic effect demand index based on a haptic effect demand level of the vibration application scenarios to obtain the haptic effect demand index.

As an improvement, the vibration control method further includes, prior to the obtaining, with reference to the haptic effect demand index, the target effect parameters from the vibration effect design model: exciting the actuator to vibrate with different vibration control signals; collecting vibration parameters and voltages of the actuator; and calculating response values of the actuator based on a response value calculation formula that is preset, the response value calculation formula being expressed as: dB=mlog{y(n)/x(n)}, where dB represents the response value, y(n) represents the vibration parameter, x(n) represents the voltage, and m is a natural constant; and respectively rectifying the effect parameters of the vibration effect design model with reference to the response values.

As an improvement, the controlling the actuator to vibrate based on the vibration control signal includes: amplifying the vibration control signal to generate a first control signal; performing, with reference to the vibration control signal, attenuating on the first control signal by using a monotonically decreasing function, to obtain a second control signal; splicing the first control signal, the second control signal, and the vibration control signal in a time domain to obtain an optimized vibration control signal; and controlling the actuator to vibrate based on the optimized vibration control signal.

Some embodiments of the present disclosure provide a vibration control device, and the vibration control device includes: an obtaining module configured to obtain, with reference to a haptic effect demand index, target effect parameters from a vibration effect design model that is preset, effect parameters of the vibration effect design model including a granularity parameter, a sharpness parameter, and a hardness parameter; a generation module configured to generate a vibration control signal based on the target effect parameters; and a control module configured to control an actuator to vibrate based on the vibration control signal.

Some embodiments of the present disclosure provide a terminal device, and the terminal device includes: a memory, a processor, and a computer program stored on the memory and executed by the processor. When the computer program is executed by the processor, the processor is configured to: obtain, with reference to a haptic effect demand index, target effect parameters from a vibration effect design model that is preset, effect parameters of the vibration effect design model including a granularity parameter, a sharpness parameter, and a hardness parameter; generate a vibration control signal based on the target effect parameters; and control an actuator to vibrate based on the vibration control signal.

As an improvement, when the computer program is executed by the processor, the processor is configured to, prior to the obtaining, with reference to the haptic effect demand index, the target effect parameters from the vibration effect design model: obtain a vibration application scenario currently triggered by a terminal; and determine the haptic effect demand index based on the vibration application scenario.

As an improvement, determining the haptic effect demand index based on the vibration application scenario comprising: querying, based on the vibration application scenario, a demand index library that is preset, the demand index library comprising a preset mapping relationship between a vibration application scenario and a haptic effect demand index; in response to no querying result, querying an associated vibration application scenario in the demand index library based on a scenario characteristic of the vibration application scenario; and determining, based on a haptic effect demand index corresponding to the associated vibration application scenario in the demand indicator library, the haptic effect demand index corresponding to the vibration application scenario currently triggered by the terminal.

As an improvement, determining, based on the haptic effect demand index corresponding to the associated vibration application scenario in the demand indicator library, the haptic effect demand index corresponding to the vibration application scenario currently triggered by the terminal includes: obtaining an association evaluation index between the vibration application scenario currently triggered by the terminal and the associated vibration application scenario; and adjusting, with reference to the association evaluation index, the haptic effect demand index corresponding to the associated vibration application scenario in the demand index library, to obtain the haptic effect demand index corresponding to the vibration application scenario currently triggered by the terminal.

As an improvement, the determining the haptic effect demand index based on the vibration application scenario includes: obtaining a general haptic effect demand index corresponding to an upper-level vibration application scenario to which the vibration application scenario belongs, the upper-level vibration application scenario comprising various types of vibration application scenarios with different haptic effect demand levels; and adjusting the general haptic effect demand index based on a haptic effect demand level of the vibration application scenarios to obtain the haptic effect demand index.

As an improvement, when the computer program is executed by the processor, the processor is configured to, prior to obtaining, with reference to the haptic effect demand index, the target effect parameters from the vibration effect design model: excite the actuator to vibrate with different vibration control signals; collect vibration parameters and voltages of the actuator; and calculate response values of the actuator based on a response value calculation formula that is preset, the response value calculation formula being expressed as: $dB = m\log\{y(n)/x(n)\}$, where dB represents the response value, y(n) represents the vibration parameter, x(n) represents the voltage, and m is a natural constant; and respectively rectify the effect parameters of the vibration effect design model with reference to the response values.

As an improvement, the controlling the actuator to vibrate based on the vibration control signal includes: amplifying the vibration control signal to generate a first control signal; performing, with reference to the vibration control signal, attenuating on the first control signal by using a monotonically decreasing function, to obtain a second control signal; splicing the first control signal, the second control signal, and the vibration control signal in a time domain to obtain an optimized vibration control signal; and controlling the actuator to vibrate based on the optimized vibration control signal.

Some embodiments of the present disclosure provide a non-transitory computer-readable storage medium storing a computer program. When the computer program is executed by a processor, the processor is configured to perform the above vibration control method.

As an improvement, the vibration control method further includes, prior to obtaining, with reference to the haptic effect demand index, the target effect parameters from the vibration effect design model: obtaining a vibration application scenario currently triggered by a terminal; and determining the haptic effect demand index based on the vibration application scenario.

As an improvement, determining the haptic effect demand index based on the vibration application scenario includes: querying, based on the vibration application scenario, a demand index library that is preset, the demand index library including a preset mapping relationship between a vibration application scenario and a haptic effect demand index; in response to no querying result, querying an associated vibration application scenario in the demand index library based on a scenario characteristic of the vibration application scenario; and determining, based on a haptic effect demand index corresponding to the associated vibration application scenario in the demand indicator library, the haptic effect demand index corresponding to the vibration application scenario currently triggered by the terminal.

As an improvement, the determining the haptic effect demand index based on the vibration application scenario includes: obtaining a general haptic effect demand index corresponding to an upper-level vibration application scenario to which the vibration application scenario belongs, the upper-level vibration application scenario comprising various types of vibration application scenarios with different haptic effect demand levels; and adjusting the general haptic effect demand index based on a haptic effect demand level of the vibration application scenarios to obtain the haptic effect demand index.

As an improvement, the determining the haptic effect demand index based on the vibration application scenario includes: obtaining a general haptic effect demand index corresponding to an upper-level vibration application scenario to which the vibration application scenario belongs, the upper-level vibration application scenario comprising various types of vibration application scenarios with different haptic effect demand levels; and adjusting the general haptic effect demand index based on a haptic effect demand level of the vibration application scenarios to obtain the haptic effect demand index.

It can be seen that, according to the vibration control method, the vibration control device, and the non-transitory computer-readable storage medium provided by the embodiments of the preset disclosure, the target effect parameters are obtained in the preset vibration effect design model with reference to the haptic effect demand index, effect parameters in the vibration effect design model including the granularity parameter, the sharpness parameter, and the hardness parameter; the vibration control signal is generated based on the target effect parameters; and the actuator is controlled to vibrate based on the vibration control signal. With the implementations of the present disclosure, the vibration control models of the actuator can be adaptively designed based on different haptic effect demand scenarios, thereby ensuring the diversity of haptic effects and the adaptability to the scenarios. A variety of perception factors are considered in the vibration effect of the actuator, thereby providing the user with a more complex haptic feedback experience.

DETAILED DESCRIPTION OF EMBODIMENTS

In order to better illustrate the purpose, features, and advantages of the present disclosure, the technical solutions in the embodiments of the present disclosure will be clearly and completely described below with reference to the accompanying drawings in the embodiments of the present disclosure. It should be understood that the described embodiments are only some, but not all, of embodiments of the present disclosure. Based on the embodiments of the present disclosure, all other embodiments obtained by those skilled in the art shall fall within a scope of the present disclosure.

With the advancement of smart devices, users have higher and higher requirements for various experiences of the operation process, among which the experience requirements for haptic effects are becoming more and more prominent. For example, in an operation of a virtual key on a smart device, an extremely short and powerful haptic feedback effect can not only bring an immediate sense of confirmation to the operation, but also give the user a pleasant sense of satisfaction. However, the haptic effects on the market are still in a design stage of simple and lack of precise control, and the vibration time of these haptic effects is long and their effects are lack of control, resulting in rough haptic effects. Therefore, it cannot meet the experience requirements in terms of clean and fast requirement, hardness requirement, strength requirement, heaviness requirement, and meticulous concentration requirement.

Figure 1:
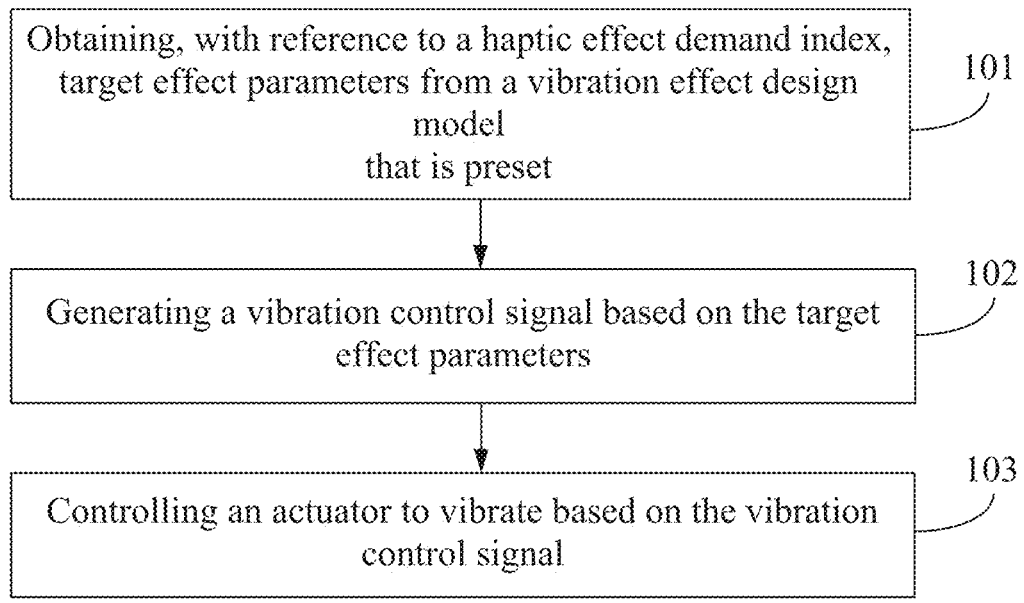
FIG. 1 is a basic flow chart of a vibration control method provided by a first embodiment of the present disclosure.

In order to solve the problems of the relatively simple haptic effect and less types of haptic effects provided by the terminal device in the related art, a first embodiment of the present disclosure provides a vibration control method. FIG. 1 is a basic flow chart of the vibration control method provided by the first embodiment of the present disclosure. The vibration control method includes step 101, step 102, and step 103.

At step 101, target effect parameters are obtained in a preset vibration effect design model with reference to a haptic effect demand index.

Figure 2:
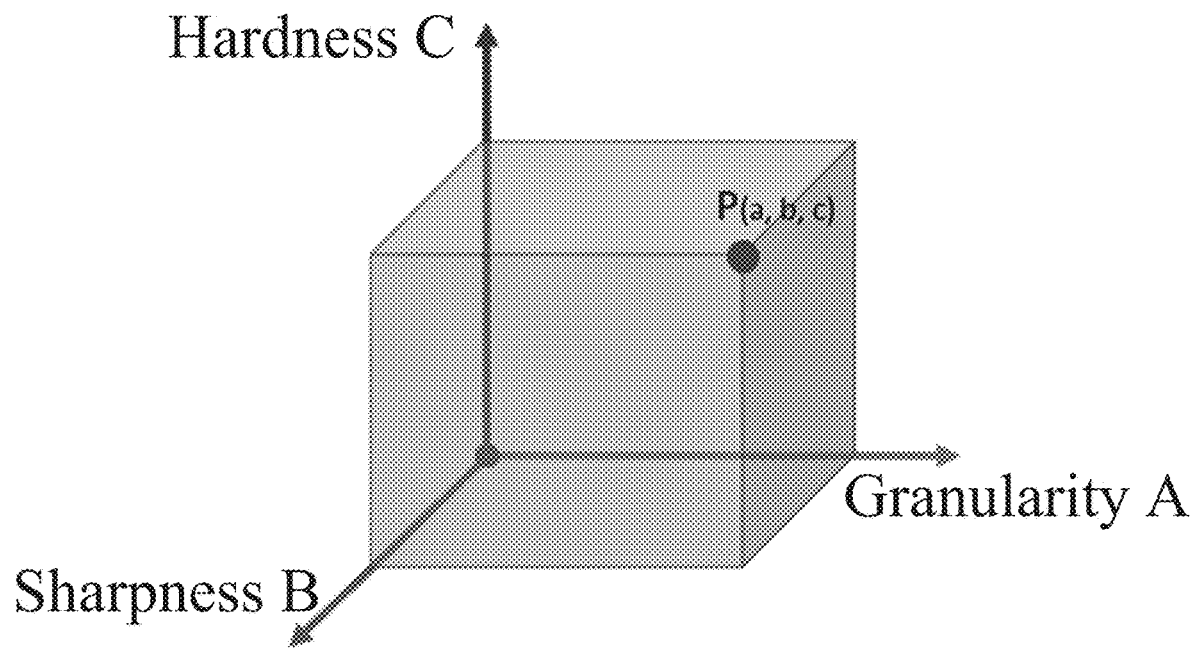
FIG. 2 is a schematic diagram of a vibration effect design model provided by the first embodiment of the present disclosure.

In an example, effect parameters in the vibration effect design model of this embodiment are designed in three dimensions, and include: a granularity parameter, a sharpness parameter, and a hardness parameter. FIG. 2 is a schematic diagram of a vibration effect design model provided by this embodiment, and P (a, b, c) represents the effect parameters obtained after parameterizing the haptic effect demand. Different effect parameters in the vibration effect design model correspond to different effect textures. For P (a, b, c), a represents the granularity parameter, b represents the sharpness parameter, and c represents the hardness parameter. Different combinations of the granularity parameter, hardness parameter, and sharpness parameter can obtain any desired effect texture.

The granularity represents the roughness of the effect texture. The larger the granularity is, the rougher the effect texture is; and the smaller the granularity is, the finer the effect texture is. The granularity is parameterized by a quantification ranging from 1 to 100. For example, when the granularity parameter is equal to 1, the effect texture is the finest; and when the granularity parameter is equal to 100, the texture of the haptic effect is the roughest, with an obvious sandy texture. In practical applications, the effects of other granularity parameters are between the finest and the roughest, and a relationship between the effects and the granularity parameters can be linear or non-linear.

The sharpness represents the sharpness of the effect texture. The greater the sharpness is, the sharper and clearer the effect texture is; and the smaller the sharpness is, the thicker the effect texture is. The sharpness is parameterized by a quantization ranging from 1 to 100. For example, when the sharpness parameter is equal to 1, the effect texture is the sharpest; and when the sharpness parameter is equal to 100, the texture of the haptic effect is the thickest, with an obvious sandy texture. The effects of other sharpness parameters are between the sharpest and the thickest, and a relationship between the effects and the sharpness parameter can be linear or non-linear.

The hardness represents the hardness of the effect texture, which is parameterized by a quantification ranging from 1 to 100. The hardness represents the hard impact degree of the effect texture. The greater the hardness is, the harder the effect texture is; and the smaller the hardness is, the softer the effect texture is. For example, when the hardness parameter is equal to 1, the effect texture is the softest; and when the hardness parameter is equal to 100, the texture of the haptic effect is the strongest and the impact force is the strongest. The effects of other hardness parameters are between the softest and the hardest, and a relationship between the effects and can be linear or non-linear.

In some implementations of this embodiment, prior to the step of obtaining the target effect parameters in the preset vibration effect design model with reference to the haptic effect demand index, the method further includes: obtaining a vibration application scenario currently triggered by a terminal; and determining a corresponding haptic effect demand index based on the vibration application scenario currently triggered by the terminal.

In an example, in this embodiment, the haptic feedback is triggered based on a characteristic of the vibration application scenario on the terminal, and there are various vibration application scenarios in practical applications, and users have different tactile demands for different vibration application scenarios. For example, the haptic effect demand index is determined based on an adaptability of a real-time vibration application scenario to ensure the diversity of haptic effects and the applicability to the scenario. It should be understood that the vibration application scenarios in this embodiment can be divided into different levels. For example, an upper-level vibration application scenario includes any one of the following scenarios: a biometric recognition scenario, a game scenario, a key input scenario, and a notification scenario. Taking the upper-level vibration application scenario "key input scenario" as an example, a lower-level vibration application scenario can include various detailed scenarios: dialing using a dial key board, text input using an input keyboard, time setting using a clock, etc., which is not limited in this embodiment.

In some implementations of this embodiment, the step of determining the haptic effect demand index based on the vibration application scenario includes: querying a preset demand index library based on the vibration application scenario; in response to no querying result, querying an associated vibration application scenario in the demand index library based on a scenario characteristic of the vibration application scenario; and determining the haptic effect demand index corresponding to the currently triggered vibration application scenario based on a haptic effect demand index corresponding to the associated vibration application scenario in the demand indicator library.

In an example, the demand index library in this embodiment includes a preset mapping relationship between the vibration application scenario and the haptic effect demand index. In practical applications, the demand index library does not fully consider all actual vibration application scenarios during construction, or a new and unexpected vibration application scenario is generated when updating application during the terminal are used, as a result, the vibration application scenario triggered during the actual terminal use process cannot query corresponding haptic effect demand index in the preset demand index library. In view of the above, in order to ensure the normal haptic feedback, in this embodiment of the present disclosure, the correlation between different vibration application scenarios is analyzed, and the haptic effect demand index of the current vibration application scenario is vaguely set based on a vibration application scenario in the demand index library that is similar to the current vibration application scenario, so as to ensure that the new vibration application scenarios that was not included in the demand index library can effectively output haptic feedback.

In some implementations of this embodiment, the step of determining the haptic effect demand index corresponding to the currently triggered vibration application scenario based on the haptic effect demand index corresponding to the associated vibration application scenario in the demand indicator library includes: obtaining an association evaluation index between the currently triggered vibration application scenario and the associated vibration application scenario; and adjusting, with reference to the associated evaluation index, the haptic effect demand index corresponding to the associated vibration application scenario in the demand index library, to obtain the haptic effect demand index corresponding to the currently triggered vibration application scenario.

In an example, in order to improve the accuracy of the haptic effect demand index corresponding to the currently triggered vibration application scenario, the correlation between the current vibration application scenario and the associated vibration application scenario is evaluated in this embodiment of the present disclosure, that is, a difference analysis between the two is analyzed in this embodiment of the present disclosure, and the haptic effect demand index applicable to the associated vibration application scenario is adjusted based on the difference between the two, so as to improve the adaptability of the finally determined haptic effect demand index to the current vibration application scenario.

In some implementations of this embodiment, the step of determining the corresponding haptic effect demand index based on the vibration application scenario includes: obtaining a general haptic effect demand index corresponding to an upper-level vibration application scenario to which the vibration application scenario belongs, the upper-level vibration application scenario including various types of vibration application scenarios with different haptic effect demand levels; and adjusting the general haptic effect demand index based on a haptic effect demand level of the vibration application scenario to obtain the corresponding haptic effect demand index.

In an example, the upper-level vibration application scenario usually includes various lower-level vibration application scenarios. If the corresponding haptic effect demand index is set for each of the lower-level vibration application scenarios, the demand index library will be complicated. In view of the above, in the embodiment of the disclosure, only a general haptic effect demand index is associated with the upper-level vibration application scenario in the demand index library, and then the haptic effect demand index corresponding to each of the lower-level vibration application scenarios in the upper-level vibration application scenario is obtained based on the general haptic effect demand index. For example, a corresponding coefficient is obtained with reference to the haptic effect demand level of each of the subordinate vibration application scenarios, and then the general haptic effect demand index is multiplied by the coefficient to obtain the corresponding haptic effect demand index. Thus, the complexity of the demand index library can be reduced.

At step 102, a corresponding vibration control signal is generated based on the target effect parameters.

In an example, the vibration control signal in this embodiment can be understood as a voltage signal, which is configured to excite the actuator to vibrate when the voltage signal is applied to the actuator. In practical applications, the voltage signal can usually be a stable voltage signal to control the actuator to change from a static state to a stable vibration state. It should be understood that for different effect parameters, an amplitude, a frequency, a period, etc. of the vibration control signal vary.

At step 103, the actuator is controlled to vibrate based on the vibration control signal.

In an example, the actuator in this embodiment is an electronic device that directly converts electrical energy into mechanical energy. The actuator vibrates to output haptic feedback to the terminal user. It should be understood that the application process of this embodiment can be a video, a game, music, etc. The actuator can be a linear motor.

In some implementations of this embodiment, prior to the step of obtaining the target effect parameters in the preset vibration effect design model with reference to the haptic effect demand index, the method further includes: exciting the actuator to vibrate with different vibration control signals; collecting vibration parameters and voltages of the actuator; calculating response values of the actuator based on a preset response value calculation formula; and correspondingly correcting different effect parameters in the vibration effect design model with reference to different response values. The response value calculation formula is expressed as: $dB=m\log\{y(n)/x(n)\}$, where dB represents the response value, $y(n)$ represents the vibration parameter, $x(n)$ represents the voltage, and m is a natural constant.

Figure 3:
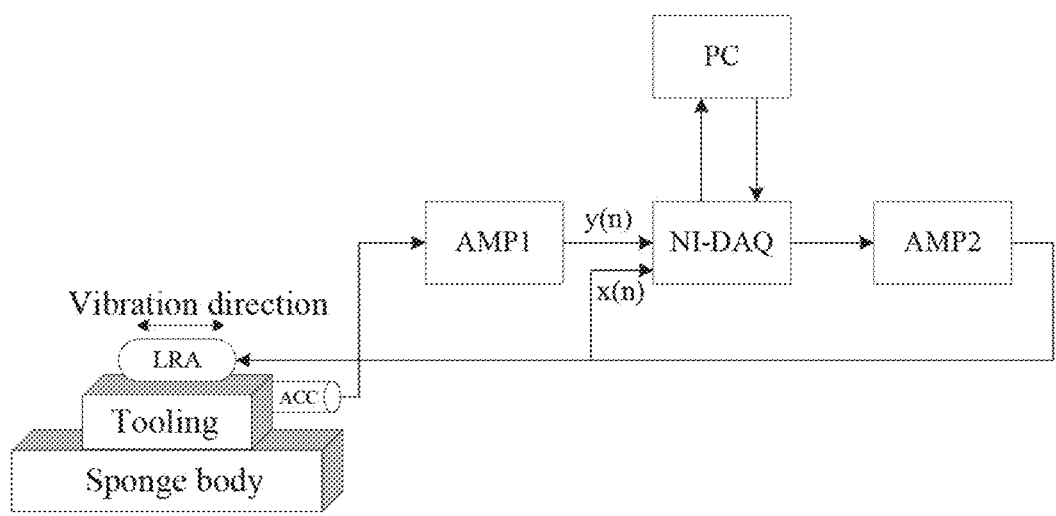
FIG. 3 is a schematic diagram of an actuator performance testing and analysis system provided by the first embodiment of the present disclosure.

FIG. 3 is a schematic diagram of an actuator performance testing and analysis system provided by an embodiment. In this embodiment, an actuator LRA can be adhered to a tooling, the tooling is placed on a sponge body to avoid an effect of the environment on the accuracy of the measurement result, and the tooling is electrically connected with an accelerometer ACC. In practical applications, a digital signal generated on the PC is transmitted to an acquisition card NI-DAQ for digital-to-analog conversion to obtain an analog signal, which is amplified by an amplifier AMP2 and is then output to the actuator LRA to excite the actuator LRA to vibrate. The vibration of the actuator LRA drive the tooling to vibrate in an opposite direction. The vibration parameters of the tooling can be collected by the accelerometer ACC, and are amplified by the amplifier AMP1 and then fed back to the acquisition card NI-DAQ. The acquisition card NI-DAQ also collects the voltage of the actuator. Finally, the PC can calculate the vibration response values actually triggered by different vibration control signals based on the vibration parameters and voltages of the actuator. In practical applications, due to the influence of objective factors, there can be a difference between a theoretical vibration response and an actual vibration response that correspond to the vibration control signal. In this embodiment, by testing the actual vibration effect of the actuator, and then rectifying the corresponding effect parameter in the vibration effect design model with reference to the actual vibration response value, the accuracy of the vibration effect of the actuator can be improved.

In some implementations of this embodiment, the step 103 includes: amplifying the vibration control signal to generate a first control signal; performing attenuating on the first control signal by using a monotonically decreasing function and with reference to the vibration control signal, to obtain a second control signal; splicing the first control signal, the second control signal, and the vibration control signal in a time domain, to obtain an optimized vibration control signal; and controlling the actuator to vibrate based on the optimized vibration control signal.

In practical applications, when the actuator is excited to vibrate by a stable voltage signal in a predetermined period, there is a buffering process in the early vibration response of the actuator, and the user experiences a large hysteresis of the vibration. In this embodiment of the present disclosure, the vibration control signal generated by optimizing the original vibration control signal is formed by sequentially splicing three segments, i.e., the first control signal, the second control signal, and the vibration control signal in a time domain. The first control signal during a first section of the time domain outputs an amplified startup voltage; the second control signal during a second section of the time domain is a voltage buffer, which steadily drops from the startup voltage to a stable voltage; and the vibration control signal during a third section of the time domain is configured to constantly output a stable voltage. In this embodiment of the present disclosure, by appropriately adjusting the excitation voltage during the acceleration section, the acceleration time during the early stage of the actuator vibration response can be shortened, the stable vibration can be achieved quickly, and the hysteresis of the actuator vibration feedback to the user can be reduced.

Compared with the related art, in the vibration control method provided by this embodiment of the present disclosure, the target effect parameters are obtained in the preset vibration effect design model with reference to the haptic effect demand index, and the effect parameters in the vibration effect design model include the granularity parameter, the sharpness parameter, and the hardness parameter; the corresponding vibration control signal is generated based on the target effect parameters; the actuator is controlled to vibrate based on the vibration control signal. With the implementations of the present disclosure, the vibration control models of the actuator can be adaptively designed based on different haptic effect demand scenarios, thereby ensuring the diversity of haptic effects and the adaptability to the scenarios. A variety of perception factors are considered in the vibration effect of the actuator, thereby providing the user with a more complex haptic feedback experience.

Figure 4:
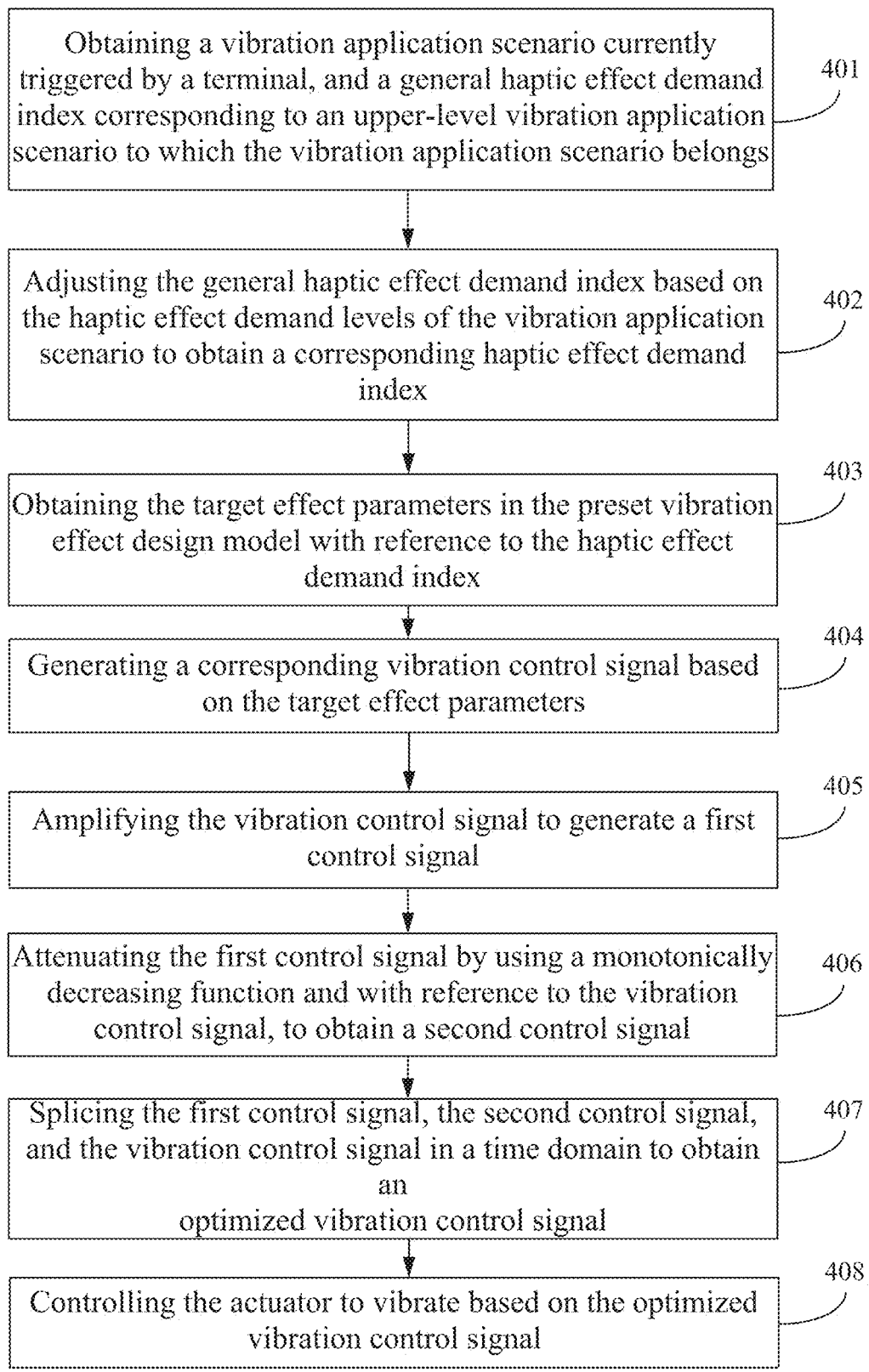
FIG. 4 is a detailed flow chart of a vibration control method provided by a second embodiment of the present disclosure.

In order to better illustrate the present disclosure, an embodiment of the present disclosure further provides a detailed vibration control method. FIG. 4 is a detailed flowchart of a vibration control method provided by a second embodiment of the present disclosure. The method includes steps 401, 402, 403, 404, 405, 406, 407, and 408.

At step 401, a vibration application scenario currently triggered by a terminal is obtained, and a general haptic effect demand index corresponding to an upper-level vibration application scenario to which the vibration application scenario belongs is obtained.

In this embodiment, the upper-level vibration application scenario includes various types of vibration application scenarios with different haptic effect demand levels.

At step 402, the general haptic effect demand index is adjusted based on the haptic effect demand level of the vibration application scenario to obtain a corresponding haptic effect demand index.

In an example, in this embodiment, only one general haptic effect demand index can be associated with the upper-level vibration application scenario in the demand index library, and then each lower-level vibration application scenario in the upper-level vibration application scenario can obtain a corresponding haptic effect demand index based on this general haptic effect demand index. Thus, the complexity of the demand index library can be reduced.

At step 403, the target effect parameters in the preset vibration effect design model are obtained with reference to the haptic effect demand index.

In an example, in this embodiment, the effect parameters in the vibration effect design model include: a granularity parameter, a sharpness parameter, and a hardness parameter.

At step 404, a corresponding vibration control signal is generated based on the target effect parameters.

At step 405, the vibration control signal is amplified to generate a first control signal.

At step 406, the first control signal is attenuated by using a monotonically decreasing function and with reference to the vibration control signal, to obtain a second control signal.

At step 407, the first control signal, the second control signal, and the vibration control signal are spliced in a time domain to obtain an optimized vibration control signal.

In an example, in this embodiment, the vibration control signal generated after optimizing the original vibration control signal is formed by sequentially splicing three segments, i.e., the first control signal, the second control signal, and the vibration control signal in a time domain. The first control signal at a first section outputs an amplified startup voltage; the second control signal at a second section is a voltage buffer, which steadily drops from the startup voltage to a stable voltage; and the vibration control signal at a third section is configured to constantly output a stable voltage. The first control signal during a first section of the time domain outputs an amplified startup voltage; the second control signal during a second section of the time domain is a voltage buffer, which is buffered from the startup voltage to a stable voltage; and the vibration control signal during a third section of the time domain is configured to constantly output a stable voltage.

At step 408, the actuator is controlled to vibrate based on the optimized vibration control signal.

Compared with the related art, on the one hand, the present disclosure can adaptively design the vibration control manner of the actuator based on different haptic effect demand scenarios, thereby ensuring the diversity of the haptic effect and the adaptability to the scenarios, and a variety of perception factors are considered in the vibration effect of the actuator, thereby providing the user with a more complex tactile feedback experience; on the other hand, by appropriately adjusting the excitation voltage of the acceleration section, the acceleration time in the early stage of the actuator vibration response can be shortened, the stable vibration can be achieved quickly, and the hysteresis of the actuator vibration feedback to the user can be reduced.

Figure 5:
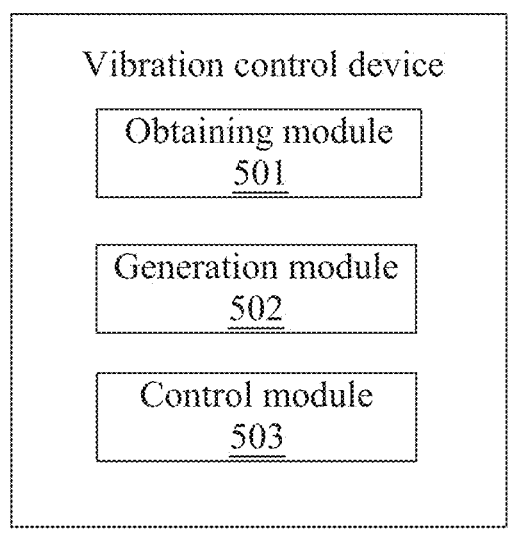
FIG. 5 is a schematic diagram of a program module of a vibration control device provided by a third embodiment of the present disclosure.

FIG. 5 illustrates a vibration control device provided by a third embodiment of the present disclosure. The vibration control device can be configured to implement the vibration control method in the aforementioned embodiments. As shown in FIG. 5, the vibration control device includes an obtaining module 501, a generation module 502, and a control module 503.

The obtaining module 501 is configured to obtain target effect parameters in a preset vibration effect design model with reference to a haptic effect demand index. The effect parameters in the vibration effect design model include a granularity parameter, a sharpness parameter, and a hardness parameter.

The generation module 502 is configured to generate a corresponding vibration control signal based on the target effect parameters.

The control module 503 is configured to control the actuator to vibrate based on the vibration control signal.

In an implementation of this embodiment, the vibration control device further includes a determination module configured to obtain a vibration application scenario currently triggered by the terminal and determine a corresponding haptic effect demand index based on the vibration application scenario.

In an implementation of this embodiment, determining, by the determination module, the corresponding haptic effect demand index based on the vibration application scenario, includes: querying, by the determination module, a preset demand index library based on the vibration application scenario, the demand index library including a mapping relationship between the preset vibration application scenario and the haptic effect demand index; in response to no querying result, querying, by the determination module, an associated vibration application scenario in the demand index library based on a scenario characteristic of the vibration application scenario; and determining, by the determination module, the haptic effect demand index corresponding to the currently triggered vibration application scenario based on the haptic effect demand index corresponding to the associated vibration application scenario in the demand indicator library.

In an implementation of this embodiment, determining, by the determination module, the haptic effect demand index corresponding to the currently triggered vibration application scenario based on the haptic effect demand index corresponding to the associated vibration application scenario in the demand indicator library, includes: obtaining, by the determination module, an association evaluation index between the currently triggered vibration application scenario and the associated vibration application scenario; and adjusting, by the determination module, with reference to the associated evaluation index, the haptic effect demand index corresponding to the associated vibration application scenario in the demand index library, to obtain the haptic effect demand index corresponding to the currently triggered vibration application scenario.

In another implementation of this embodiment, determining, by the determination module, the corresponding haptic effect demand index based on the vibration application scenario, includes: obtaining, by the determination module, a general haptic effect demand index corresponding to an upper-level vibration application scenario to which the vibration application scenario belongs, the upper-level vibration application scenario including various types of vibration application scenarios with different haptic effect demand levels; and adjusting, by the determination module, the general haptic effect demand index based on the haptic effect demand level of the vibration application scenario to obtain the corresponding haptic effect demand index.

In an implementation of this embodiment, the vibration control device further includes a rectifying module configured to excite the actuator to vibrate through different vibration control signals; collect vibration parameters and voltages of the actuator, calculate response values of the actuator based on a preset response value calculation formula; and respectively rectify different effect parameters in the vibration effect design model with reference to different response values. The response value calculation formula is expressed as: $dB = m\log\{y(n)/x(n)\}$, where dB represents the response value, y(n) represents the vibration parameter, x(n) represents the voltage, and m is a natural constant.

In an implementation of this embodiment, the control module is configured to: amplify the vibration control signal to generate a first control signal; attenuate the first control signal by using a monotonically decreasing function and with reference to the vibration control signal, to obtain a second control signal; splice the first control signal, the second control signal, and the vibration control signal in a time domain, to obtain an optimized vibration control signal; and control the actuator to vibrate based on the optimized vibration control signal.

It should be understood that, the vibration control method in the first and second embodiments can be implemented based on the vibration control device provided in this embodiment, and those of ordinary skill in the art can clearly understand that for the convenience and brevity of description, reference can be made to the corresponding process in the method embodiments for a working process of the vibration control device described in this embodiment, and details thereof are not described herein again.

Compared with the related art, the vibration control device provided in this embodiment, the target effect parameters are obtained in the preset vibration effect design model with reference to the haptic effect demand index, and effect parameters in the vibration effect design model include a granularity parameter, a sharpness parameter and a hardness parameter; a corresponding vibration control signal is generated based on the target effect parameters; the actuator is controlled to vibrate based on the vibration control signal. With the implementations of the present disclosure, the vibration control models of the actuator can be adaptively designed based on different haptic effect demand scenarios, thereby ensuring the diversity of haptic effects and the adaptability to the scenarios. A variety of perception factors are considered in the vibration effect of the actuator, thereby providing the user with a more complex haptic feedback experience.

Figure 6:
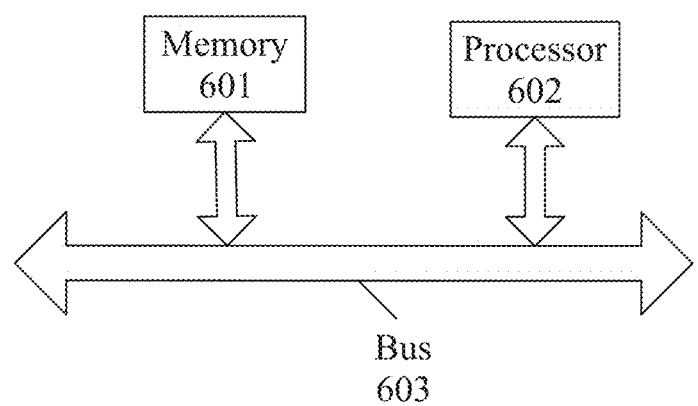
FIG. 6 is a schematic diagram of a terminal device provided by a fourth embodiment of the present disclosure.

FIG. 6 illustrates a terminal device provided by a fourth embodiment of the present disclosure. With reference to FIG. 6, the terminal device can be configured to implement the vibration control method in the aforementioned embodiments. As shown in FIG. 6, the terminal device includes: a memory 601, a processor 602, a bus 603, and a computer program stored in the memory 601 and executed by the processor 602. The memory 601 and the processor 602 are connected to each other through the bus 603. When the computer program is executed by the processor 602, the vibration control method in the aforementioned embodiments is implemented. It should be understood that the number of the processer can be greater than one or equal to one.

The memory 601 can be a high-speed random access memory (RAM), or a non-volatile memory, such as a disk memory. The memory 601 is configured to store executable program codes, and the processor 602 is connected to the memory 601.

An embodiment of the present disclosure further provides a computer-readable storage medium. The computer-readable storage medium can be arranged in the terminal device in the above embodiments, and the computer-readable storage medium can be the memory described in the embodiment shown in FIG. 6.

A computer-program is stored in the computer-readable storage medium, and when the program is executed by the processor, the vibration control method in the above embodiments is implemented. The computer-storable medium can also be any other medium that can store program codes, such as a U disk, a portable hard disk, a read-only memory (ROM), a random access memory (RAM), a magnetic disk, or an optical disk.

In the several embodiments provided by the present disclosure, it should be understood that the disclosed device and method can be implemented in other manners. For example, the device embodiments described above are merely illustrative. For example, division of modules is only a logical function division, and there can be other division method in actual implementations. For example, multiple modules or components can be combined or integrated into another system, or some features can be omitted or not implemented. The mutual coupling or direct coupling or communication connection that is shown or described can be implemented through some interfaces, indirect coupling, or communication connection of devices or modules, and can be implemented through an electrical manner, a mechanical manner or other manner.

Modules described as separate components can or can not be physically separated, and components shown as modules can or can not be physical modules, that is, can be located at one location, or can be disposed in multiple network modules. Some or all of the modules can be selected according to actual needs to achieve the purpose of the solution in these embodiments of the present disclosure.

In each embodiment of the present disclosure, each functional module can be integrated into one processing module, or each module can exist physically alone, or two or more modules can be integrated into one module. The aforementioned integrated modules can be implemented in the form of hardware, and can also be implemented in the form of software function modules.

The integrated modules, if implemented in the form of software functional modules and sold or used as independent products, can be stored in a computer-readable storage medium. Based on such understanding, the essence of the technical solutions of the present disclosure, or the part of the technical solutions of the present disclosure that contributes to the prior art, or the whole or part of the technical solutions of the present disclosure can be embodied in the form of a software product. The computer software product is stored in a readable storage medium, and includes several instructions for causing a computer device (which can be a personal computer, a server, or a network device, etc.) to execute all or part of the steps of the methods of various embodiments of the present disclosure. The aforementioned readable storage medium can be any medium that can store program codes, such as a U disk, portable hard disk, a ROM, a RAM, a magnetic disk, or an optical disk.

It should be understood that, the above method embodiments are described as a series of actions combinations for the convenience of description, but those skilled in the art should know that the present disclosure is not limited by the described performance sequence, as in accordance with the present disclosure, at least one step can be performed in other orders or simultaneously. Those skilled in the art should also know that the embodiments described in the specification are some embodiments, and the actions and modules involved are not all necessary to the present disclosure.

In the aforementioned embodiments, the description of each embodiment has respective emphasis. For parts that are not described in detail in a certain embodiment, reference can be made to related descriptions of other embodiments.

The above description is a description of the vibration control method, the terminal device and the computer-readable storage medium provided by the present disclosure. For those skilled in the art, according to the concept of the embodiments of the present disclosure, some changes in a specific implementation and application scope can be obtained. To sum up, the content of the specification shall not be construed as a limitation to the present disclosure.

What is claimed is:

1. A vibration control method, comprising:
obtaining, with reference to a haptic effect demand index, target effect parameters from a vibration effect design model that is preset, effect parameters of the vibration effect design model comprising a granularity parameter, a sharpness parameter, and a hardness parameter;
generating a vibration control signal based on the target effect parameters; and controlling an actuator to vibrate based on the vibration control signal.

2. The vibration control method as described in claim 1, further comprising, prior to said obtaining, with reference to the haptic effect demand index, the target effect parameters from the vibration effect design model:
  obtaining a vibration application scenario currently triggered by a terminal; and
  determining the haptic effect demand index based on the vibration application scenario.

3. The vibration control method as described in claim 2, wherein said determining the haptic effect demand index based on the vibration application scenario comprises: querying, based on the vibration application scenario, a demand index library that is preset, the demand index library comprising a preset mapping relationship between a vibration application scenario and a haptic effect demand index;
  in response to no querying result, querying an associated vibration application scenario in the demand index library based on a scenario characteristic of the vibration application scenario; and
  determining, based on the haptic effect demand index corresponding to the associated vibration application scenario in the demand index library, the haptic effect demand index corresponding to the vibration application scenario currently triggered by the terminal.

4. The vibration control method as described in claim 3, wherein said determining, based on the haptic effect demand index corresponding to the associated vibration application scenario in the demand index library, the haptic effect demand index corresponding to the vibration application scenario currently triggered by the terminal comprises:
  obtaining an association evaluation index between the vibration application scenario currently triggered by the terminal and the associated vibration application scenario; and
  adjusting, with reference to the association evaluation index, the haptic effect demand index corresponding to the associated vibration application scenario in the demand index library, to obtain the haptic effect demand index corresponding to the vibration application scenario currently triggered by the terminal.

5. The vibration control method as described in claim 2, wherein said determining the haptic effect demand index based on the vibration application scenario comprises:
  obtaining a general haptic effect demand index corresponding to an upper-level vibration application scenario to which the vibration application scenario belongs, the upper-level vibration application scenario comprising various types of vibration application scenarios with different haptic effect demand levels; and
  adjusting the general haptic effect demand index based on a haptic effect demand level of the vibration application scenarios to obtain the haptic effect demand index.

6. The vibration control method as described in claim 1, further comprising, prior to said obtaining, with reference to the haptic effect demand index, the target effect parameters from the vibration effect design model:
  exciting the actuator to vibrate with different vibration control signals;
  collecting vibration parameters and voltages of the actuator;
  calculating response values of the actuator based on a response value calculation formula that is preset, the response value calculation formula being expressed as: dB=mlog{y(n)/x(n)}, where dB represents the response value, y(n) represents the vibration parameter, x(n) represents the voltage, and m is a natural constant; and
  respectively rectifying the effect parameters of the vibration effect design model with reference to the response values.

7. The vibration control method as described in claim 1, where said controlling the actuator to vibrate based on the vibration control signal comprises:
  amplifying the vibration control signal to generate a first control signal;
  performing, with reference to the vibration control signal, attenuating on the first control signal by using a monotonically decreasing function, to obtain a second control signal;
  splicing the first control signal, the second control signal, and the vibration control signal in a time domain to obtain an optimized vibration control signal; and
  controlling the actuator to vibrate based on the optimized vibration control signal.

8. A vibration control device, comprising:
  an obtaining module configured to obtain, with reference to a haptic effect demand index, target effect parameters from a vibration effect design model that is preset, effect parameters of the vibration effect design model comprising a granularity parameter, a sharpness parameter, and a hardness parameter;
  a generation module configured to generate a vibration control signal based on the target effect parameters; and
  a control module configured to control an actuator to vibrate based on the vibration control signal.

9. A terminal device, comprising:
  a memory,
  a processor, and
  a computer program stored on the memory and executed by the processor,
  wherein when the computer program is executed by the processor, the processor is configured to:
  obtain, with reference to a haptic effect demand index, target effect parameters from a vibration effect design model that is preset, effect parameters of the vibration effect design model comprising a granularity parameter, a sharpness parameter, and a hardness parameter;
  generate a vibration control signal based on the target effect parameters; and
  control an actuator to vibrate based on the vibration control signal.

10. The terminal device as described in claim 9, wherein when the computer program is executed by the processor, the processor is configured to, prior to said obtaining, with reference to the haptic effect demand index, the target effect parameters from the vibration effect design model:
  obtain a vibration application scenario currently triggered by a terminal; and
  determine the haptic effect demand index based on the vibration application scenario.

11. The terminal device as described in claim 10, wherein said determining the haptic effect demand index based on the vibration application scenario comprises:
  querying, based on the vibration application scenario, a demand index library that is preset, the demand index library comprising a preset mapping relationship between a vibration application scenario and the haptic effect demand index; in response to no querying result, querying an associated vibration application scenario in the demand index library based on a scenario characteristic of the vibration application scenario; and determining, based on a haptic effect demand index corresponding to the associated vibration application scenario in the demand index library, the haptic effect demand index corresponding to the vibration application scenario currently triggered by the terminal.

12. The terminal device as described in claim 11, wherein said determining, based on the haptic effect demand index corresponding to the associated vibration application scenario in the demand index library, the haptic effect demand index corresponding to the vibration application scenario currently triggered by the terminal comprises: obtaining an association evaluation index between the vibration application scenario currently triggered by the terminal and the associated vibration application scenario; and adjusting, with reference to the association evaluation index, the haptic effect demand index corresponding to the associated vibration application scenario in the demand index library, to obtain the haptic effect demand index corresponding to the vibration application scenario currently triggered by the terminal.

13. The terminal device as described in claim 10, wherein said determining the haptic effect demand index based on the vibration application scenario comprises:
   obtaining a general haptic effect demand index corresponding to an upper-level vibration application scenario to which the vibration application scenario belongs, the upper-level vibration application scenario comprising various types of vibration application scenarios with different haptic effect demand levels; and
   adjusting the general haptic effect demand index based on a haptic effect demand level of the vibration application scenarios to obtain the haptic effect demand index.

14. The terminal device as described in claim 9, wherein when the computer program is executed by the processor, the processor is further configured to, prior to said obtaining, with reference to the haptic effect demand index, the target effect parameters from the vibration effect design model:
   excite the actuator to vibrate with different vibration control signals;
   collect vibration parameters and voltages of the actuator; and
   calculate response values of the actuator based on a response value calculation formula that is preset, the response value calculation formula being expressed as: $dB = m\log\{y(n)/x(n)\}$, where dB represents the response value, $y(n)$ represents the vibration parameter, $x(n)$ represents the voltage, and m is a natural constant; and
   respectively rectify the effect parameters of the vibration effect design model with reference to the response values.

15. The terminal device as described in claim 9, where said controlling the actuator to vibrate based on the vibration control signal comprises:
   amplifying the vibration control signal to generate a first control signal;
   performing, with reference to the vibration control signal, attenuating on the first control signal by using a monotonically decreasing function, to obtain a second control signal;
   splicing the first control signal, the second control signal, and the vibration control signal in a time domain to obtain an optimized vibration control signal; and
   controlling the actuator to vibrate based on the optimized vibration control signal.

16. A non-transitory computer-readable storage medium, storing a computer program, wherein when the computer program is executed by a processor, the processor is configured to perform the vibration control method as described in claim 1.

17. The non-transitory computer-readable storage medium as described in claim 16, wherein the vibration control method further comprises, prior to said obtaining, with reference to the haptic effect demand index, the target effect parameters from the vibration effect design model:
   obtaining a vibration application scenario currently triggered by a terminal; and
   determining the haptic effect demand index based on the vibration application scenario.

18. The non-transitory computer-readable storage medium as described in claim 17, wherein said determining the haptic effect demand index based on the vibration application scenario comprises:
   querying, based on the vibration application scenario, a demand index library that is preset, the demand index library comprising a preset mapping relationship between a vibration application scenario and a haptic effect demand index; in response to no querying result, querying an associated vibration application scenario in the demand index library based on a scenario characteristic of the vibration application scenario; and determining, based on the haptic effect demand index corresponding to the associated vibration application scenario in the demand index library, the haptic effect demand index corresponding to the vibration application scenario currently triggered by the terminal.

19. The non-transitory computer-readable storage medium as described in claim 18, wherein said determining, based on the haptic effect demand index corresponding to the associated vibration application scenario in the demand index library, the haptic effect demand index corresponding to the vibration application scenario currently triggered by the terminal comprises:
   obtaining an association evaluation index between the vibration application scenario currently triggered by the terminal and the associated vibration application scenario; and
   adjusting, with reference to the association evaluation index, the haptic effect demand index corresponding to the associated vibration application scenario in the demand index library, to obtain the haptic effect demand index corresponding to the vibration application scenario currently triggered by the terminal.

20. The non-transitory computer-readable storage medium as described in claim 17, wherein said determining the haptic effect demand index based on the vibration application scenario comprises:
   obtaining a general haptic effect demand index corresponding to an upper-level vibration application scenario to which the vibration application scenario belongs, the upper-level vibration application scenario comprising various types of vibration application scenarios with different haptic effect demand levels; and
   adjusting the general haptic effect demand index based on a haptic effect demand level of the vibration application scenarios to obtain the haptic effect demand index.

* * * * *